United States Patent [19]
Banchelin et al.

[11] Patent Number: 5,814,268
[45] Date of Patent: Sep. 29, 1998

[54] PROCESS OF MAKING A GOLF CLUB SHAFT

[75] Inventors: Jean-Marc Banchelin, Annecy Le Vieux; Philippe Renard, La Balme de Sillingy; Serge Solviche, Cran Gevrier, all of France

[73] Assignee: Taylor Made Golf Company, Inc., Carlsbad, Calif.

[21] Appl. No.: 774,079

[22] Filed: Dec. 23, 1996

Related U.S. Application Data

[63] Continuation-in-part of Ser. No. 427,252, Apr. 24, 1995, abandoned, which is a continuation-in-part of Ser. No. 35,316, May 11, 1993, abandoned, which is a continuation of Ser. No. 802,546, Dec. 5, 1991, abandoned.

[30] Foreign Application Priority Data

Dec. 5, 1990 [FR] France .................. 90 15387

[51] Int. Cl.⁶ ................. B29C 49/00; B29C 70/44
[52] U.S. Cl. .............. 264/516; 156/156; 156/175; 156/191; 156/194; 156/285; 156/287; 264/257; 264/258; 264/314
[58] Field of Search ............... 264/257, 258, 264/314, 516; 156/156, 175, 191, 194, 285, 287

[56] References Cited

U.S. PATENT DOCUMENTS

| | | | |
|---|---|---|---|
| 3,755,037 | 8/1973 | Erwin et al. | 156/285 X |
| 4,202,856 | 5/1980 | Frikken et al. | 264/258 X |
| 4,397,048 | 8/1983 | Brown et al. | 264/258 X |
| 4,555,113 | 11/1985 | Shimazaki et al. | 156/175 X |
| 4,876,049 | 10/1989 | Aoyama et al. | 264/314 X |
| 4,931,247 | 6/1990 | Yeh | 264/258 |
| 5,071,506 | 12/1991 | Nelson et al. | 156/156 X |

FOREIGN PATENT DOCUMENTS

| | | |
|---|---|---|
| 40492 | 11/1981 | European Pat. Off. . |
| 2746173 | 4/1979 | Germany ............... 264/314 |
| 51-34968 | 3/1976 | Japan . |
| 54-23627 | 8/1979 | Japan . |
| 57-98320 | 6/1982 | Japan ................ 264/516 |
| 1312543 | 4/1973 | United Kingdom . |
| 1366773 | 9/1974 | United Kingdom . |
| 1498892 | 1/1978 | United Kingdom . |
| 1554353 | 10/1979 | United Kingdom . |
| 2040790 | 9/1980 | United Kingdom . |
| 2085351 | 4/1982 | United Kingdom . |

*Primary Examiner*—Leo B. Tentoni
*Attorney, Agent, or Firm*—Greenblum & Bernstein, P.L.C.

[57] ABSTRACT

Process for manufacturing a golf club shaft made of composite materials, including the successive steps of fitting a tubular, flexible impermeable bladder around a rigid mandrel whose length is at least equal to the length of the shaft to be produced, dressing the mandrel with a composite structure comprising fibers impregnated with a synthetic resin matrix, placing the mandrel in the mold, and then carrying out a mold operation by applying at least one internal pressure exerted by feeding a fluid inside the bladder.

10 Claims, 5 Drawing Sheets

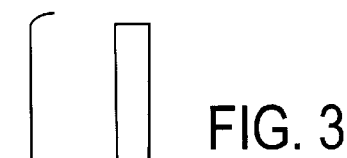
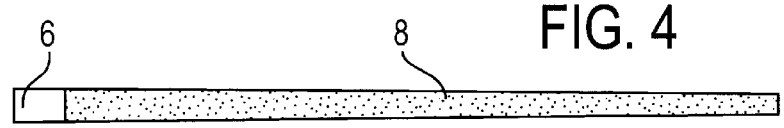
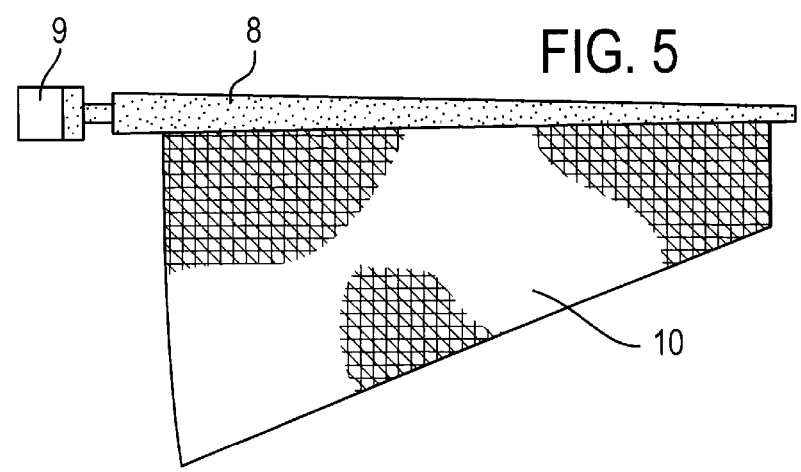

PROCESS OF MAKING A GOLF CLUB SHAFT

CROSS-REFERENCE TO RELATED APPLICATIONS

This is a continuation-in-part of application Ser. No. 08/427,252, filed on Apr. 24, 1995, now abandoned, which is a continuation-in-part of application Ser. No. 08/035,316, filed on May 11, 1993, now abandoned, which is a continuation of application Ser. No. 07/802,546, filed on Dec. 5, 1991, now abandoned.

BACKGROUND OF THE INVENTION

1. Field of the Invention

The invention relates to the manufacture of golf club shafts and more specifically concerns a new process for the manufacture of shafts from composite materials and a device for implementation of this process, as well as the shafts thus manufactured.

2. Description of Background and Relevant Information

A process for the manufacture of tubular objects such as fishing rods and golf clubs made of resin reinforced with carbon or other fibers is described in Patents No. GB 1 446 444 and U.S. Pat. No. 4,555,113.

The process involves winding, around a mandrel, sheets or layers of fibers pre-impregnated with epoxy resin, for example, then compressing this stack by taping using a thermoretractable polyester film. The mandrel covered in this way is then placed in an oven in order both to bake the composite covering and to cause compression of the covering around the mandrel through pressure exerted by the retraction of the film. Finally, after hardening of the resin, the mandrel and the tape are removed. Surface irregularities or traces left by the tape, commonly called steps, are abraded by grinding with emery during the shaft-finishing operation.

A variant of this procedure involves dressing the mandrel by filament winding using a yarn preliminarily impregnated with resin.

However, golfers, and especially top-level players, do not find these processes, which are very commonly used by manufacturers, entirely satisfactory, since they do not allow the mechanical properties to be reproduced from one shaft to another.

The substantial differences in the performances of these clubs, which are brought to light by professional golfers, result, in particular, from the removal of material during the required shaft-finishing operation.

Furthermore, these procedures appreciably restrict the opportunities for producing shafts having a complex shape, such as biconical shafts which may or may not incorporate reversed conicity of the areas of enlargement or narrowing, for example.

U.S. Pat. No. 3,755,037 (Erwin et al.) relates to the manufacture of fiber-reinforced tennis or squash racquets and other curved articles. The manufacture of rectilinear tubular objects having particular predetermined desired shapes is neither disclosed nor suggested. The composite structure of the racquet base is obtained from a tubular member which has a uniform section over its entire length and which is formed in a mold to provide an open oval or loop and spaced apart, parallel handle portions. The process uses an expansible casing which is impermeable to fluids. The strength requirements for the casing are modest, i.e., any thin and somewhat elastic material can be used, since only weak pressures, of the order of 50 to 100 psi, are brought to bear by the fluid introduced inside the casing. According to Erwin, such pressures are entirely sufficient for expanding the casing and forcing the helical windings into contact with the walls of the mold, given the fact that, in Erwin, portions of more complex shape are obtained through the addition of reinforcements or additional layers at the desired locations.

The present invention differs from Erwin by providing a rigid mandrel of simple, substantially conical shape, and arranging around this mandrel an elongated, flexible impermeable bladder of identical shape, so that the bladder adapts itself precisely to the mandrel, thereby completely preventing tyhe formation of folds and other irregularities, even in the portions of very small diameter, such as the tip end of the shaft where the internal diameter is no greater than 3 mm, despite the thinness of the bladder of less than one millimeter. No reinforcements or composite materials are used.

Another distinction over Erwin is that, according to the present invention, the mandrel is dressed with a continuous lay-up of fiber sheets having an orientation which depends on the desired characteristics of the shaft being produced, such as flexional and torsional rigidity, which must be perfectly controlled during manufacture and which must be reproducible from one shaft to another. Erwin does not use a fiber sheet lay-up, but merely helically wound fiber bands, and does not confront the problem which is overcome by the invention, which, unlike Erwin, relates to golf club shafts of greatly elongated shape.

SUMMARY OF THE INVENTION

The object of the present invention is to propose a manufacturing process that is reproducible, easy to implement and that allows the production of shafts having a complex shape made of continuous layers of fiber sheets.

Another object of the invention is to make it possible, by means of the molding procedure, to produce a shaft having the proper finished state.

A further object of the invention is to manufacture shafts having complex shapes and homogeneous mechanical properties that prove difficult or impossible to produce using currently-known techniques.

To this end, the object of the invention is a process for the manufacture of a golf club shaft from composite materials, comprising the following successive steps:

(a) producing an elongated, flexible impermeable bladder by dipping a template in a coagulating bath and then in a latex bath, the bladder having a first, open end and a second, closed end and a cross-section which decreases from adjacent the first end toward the second end, the bladder having a thickness of less than 1.0 mm and a length in excess of 1.0 meter;

(b) arranging the bladder around a rigid mandrel having a substantially conical shape identical with a shape of the template, and a length at least equal to a length of a shaft to be produced;

(c) preparing a continuous lay-up of fiber sheets having an orientation which depends on characteristics desired;

(d) dressing the mandrel with the lay-up of fiber sheets comprising fibers impregnated with an organic resin matrix to obtain a truncated cone-like composite structure;

(e) placing the composite structure in a mold which has an impression which incorporates at least one area of enlargement or narrowing; and (f) carrying out a molding operation by applying inside the bladder at least one internal pressure exerted by a fluid feed through the open end, so as to compress the composite structure against the impression of the mold and produce a counterform of the area on desired locations of the shaft.

BRIEF DESCRIPTION OF THE DRAWINGS

Other objects, advantages, and features of the invention will emerge more clearly from the description of an embodiment of the invention provided below with reference to the attached drawings.

FIGS. 3 to 8 illustrate different steps of the process for manufacture of a shaft according to the invention.

DETAILED DESCRIPTION

Figure 1:
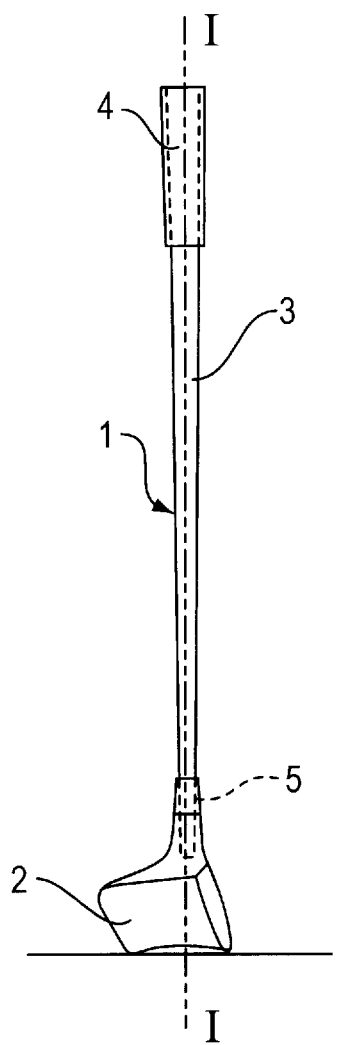
FIG. 1 shows a golf club on which a shaft manufactured by the process according to the invention is mounted.
Figure 2:
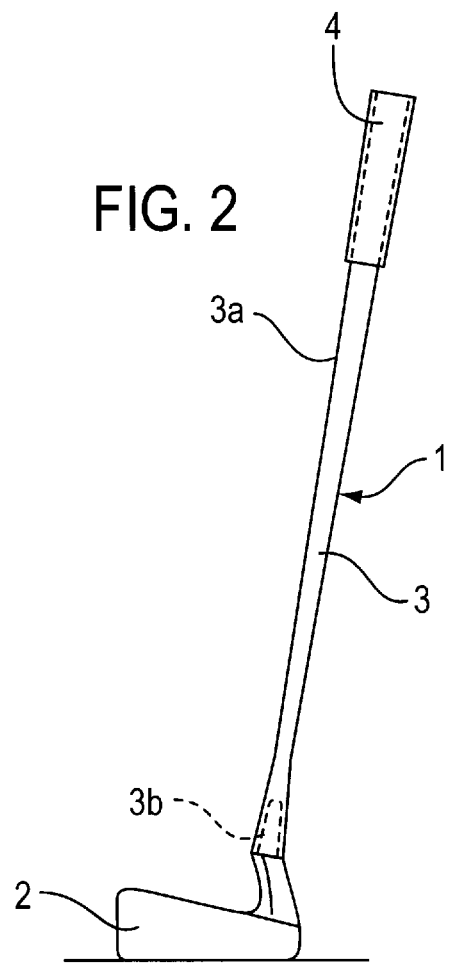
FIG. 2 shows a golf club on which another shaft manufactured by the process according to the invention is mounted.

As shown in FIG. 1, a golf club generally comprises a head 2, a shaft 3, a grip or handle 4, and possibly an intermediate part 5 termed "hosel" which acts mainly to strengthen the head/shaft connection. The shaft 3 is not a simple tube having a constant section, but, more generally, a tubular conical object whose largest section is located in the area of the handle 4. However, as shown in FIG. 2, in some cases, and especially as regards clubs called putters, the shaft 3 may comprise a small part 3b in whose lower section the conicity is reversed with respect to the main part 3a of the shaft. The shaft 3 according to the invention is made of composite materials, and in particular fibers immersed in a polymerized organic resin. Longitudinal flection stresses are essentially taken up by fibers arranged longitudinally along axis I of shaft 3, while torsion stresses are taken up by fibers wound in a substantially circumferential arrangement. The proportion of longitudinal fibers, whether wound or arranged at a specific angle with longitudinal axis I, are chosen according to the desired characteristics of the club.

The preferred embodiment of the inventive process is illustrated in FIGS. 3 to 8. It includes a first step involving the production of an elongated, flexible impermeable bladder 8 whose length is preferably at least equal to the length of the desired shaft, i.e., normally in excess of 1.0 m. The bladder has an open end and a closed end and a cross-section which decreases from adjacent the open end toward the closed end.

According to one important feature of the invention, bladders are made of an elastomer which must be employed by soaking to ensure the proper required shape. This technique is also known in other technical fields to those of ordinary skill in the art in the production of gloves, bladders, and thin rubber objects of complex shapes, and for which the main characteristics sought are pronounced stretching capacity and complete impermeability to gases and fluids. The elastomers that can be used within the scope of the invention include latex, neoprenes, or siliconized elastomers. Applicant prefers the use of a latex bladder.

As shown in FIG. 3, use is made, to this end, of a part, or template, 6, which is immersed in a coagulating bath of calcium nitrate, for example, and then in a latex bath 7. After coagulation, the bladder 8 is baked for approximately 10 minutes at between 70° and 80° C. This technique makes it possible to obtain bladders having a thickness of less than 1.0 mm, preferably in the range of 0.5 to 0.8 mm. After cooling, the bladder is arranged on the rigid molding mandrel 9 having a shape substantially identical with the shape of the template and a length at least equal to that of the shaft to be produced. (The mandrel may be used as a template during the immersion step.)

The following step, illustrated in FIG. 5, consists in dressing the mandrel with layers of fibers impregnated with an organic resin matrix to obtain a composite structure. The materials used within the scope of the invention are carbon fibers pre-impregnated with epoxy and made by the HEXCEL-GENIN company, e.g., of the T6T-135 or T6M-135 type. Of course, this procedure can be applied to shaft molding by using other fibers such as glass, ARAMID (Registered Trademark), or other fibers.

Dressing of the mandrel 9 on which the bladder is precisely fitted is achieved by winding a continuous lay-up 10 of fiber sheets whose orientation depends on the characteristics desired. A truncated cone-like composite structure 11 formed from multiple layers of fiber sheets is thus obtained without any internal folds thanks to the precise correspondence of the respective shapes of the mandrel and bladder.

Figure 6:
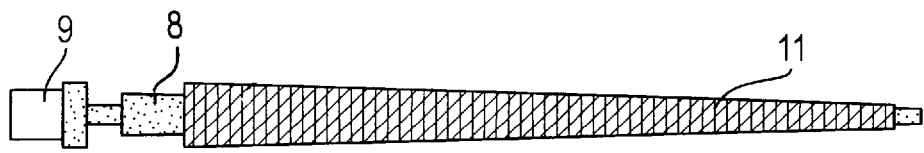

The mandrel 9 formed and illustrated in FIG. 6 is thus covered with a dressing 11 composed of a stack of from twelve to fifteen layers of pre-impregnated fibers.

Figure 7:
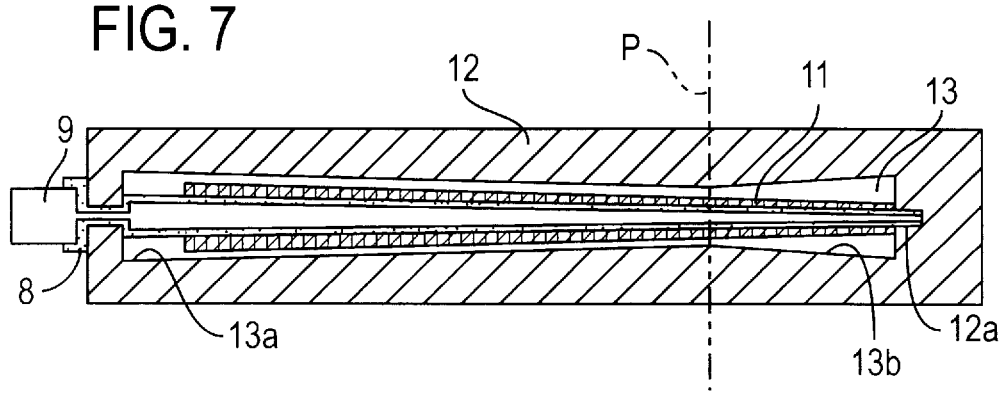
Figure 8:
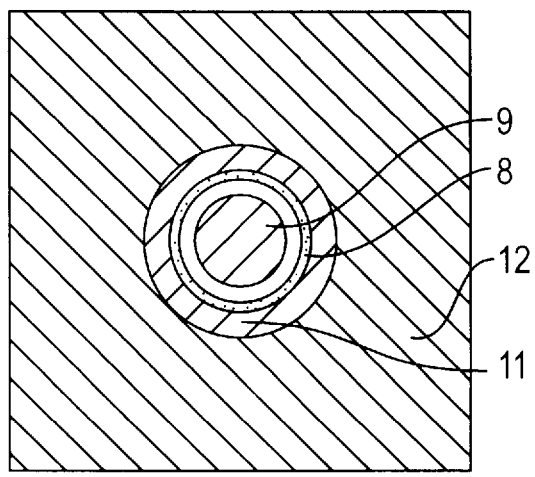

After dressing, at least a substantial portion of mandrel 9 is removed from the composite structure, and, as shown in FIGS. 7 to 8, the mandrel 9 is then placed in a mold 12 whose impression 13 delimits the final shape of the shaft. FIG. 7 shows an example of the invention in which the impression 13 comprises two zones 13a, 13b delimited by the plane P and whose conical shapes are reversed on either side of this plane. Generally speaking, the impression 13 may incorporate areas of enlargement or narrowing so as to produce, during molding, the counterform of the area produced on the shaft in the desired locations. The inventive process makes possible the use of a single conical mandrel for molding shafts of various shapes. This capability is very advantageous both from a technical standpoint, since the manufacture of shafts of complex shapes from steel is a difficult operation, and from an economic standpoint, since one mandrel shape can be adapted to many different mold shapes.

It may be advantageous to form a cavity or centering shoulder 12a at the end of the mold 12 opposite the end used to insert a part of the mandrel 9 whose end is not completely covered by the bladder 8.

The molding operation is conducted by heating the mold and by applying at least one internal pressure, e.g., in the range of 10 to 15 bars, exerted by the feed of a gas inside of the flexible bladder 8 through its open end, in order to force the composite structure 11 against the impression 13 of the mold 12. The molding cycle varies according to the nature and reactivity of the pre-impregnated materials used. By way of example, for pre-impregnated epoxy materials the mold is heated to 150° C., then cooled to ambient temperature. Heating and cooling times are 15 and 10 minutes, respectively. Pressurization takes place at from 40° to 50° C. during the heating phase and is kept stabilized until the end of the molding cycle.

FIG. 8 shows the arrangement of components at the periphery of the mandrel after injection of a compressed fluid, such as compressed air, inside the bladder. After opening the mold, the mandrel can be easily removed without special tools simply because of the space created by compression and formed between the mandrel 9 and the bladder 8, which is encased by the composite structure 11.

Figure 9:
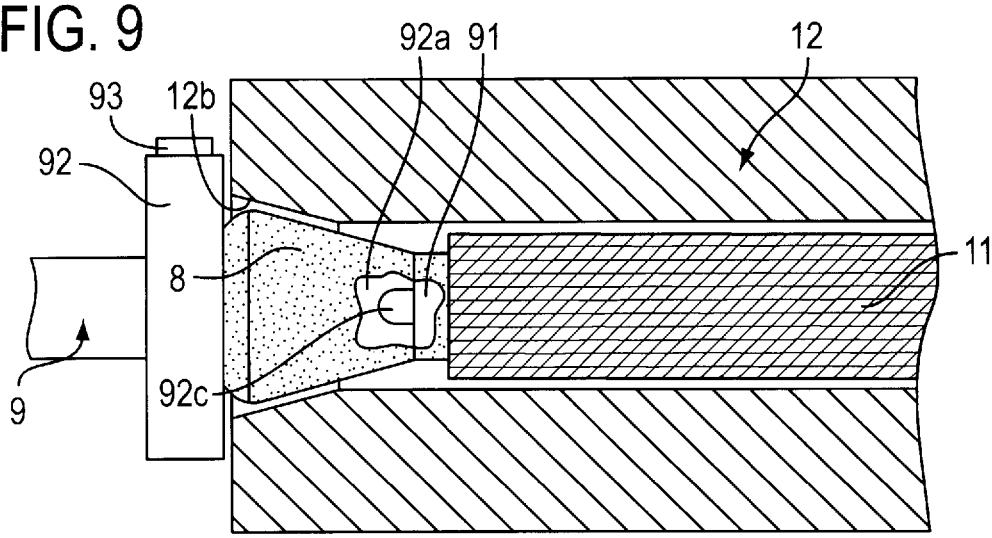
FIG. 9 is a partial detailed view of the molding device for implementation of the process.
Figure 10:
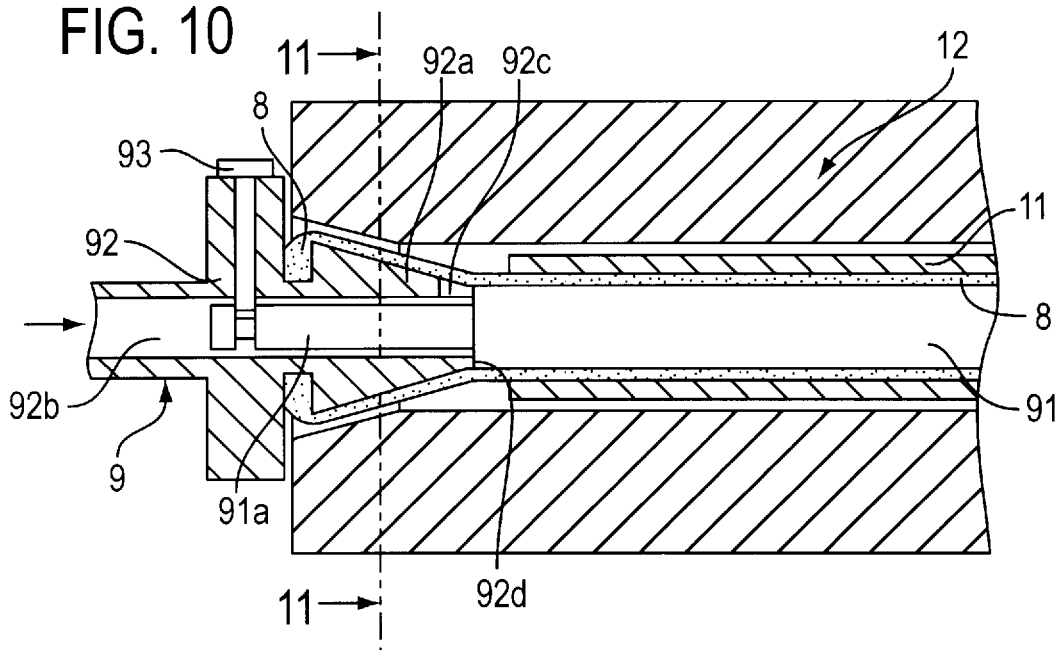
FIG. 10 is a detailed cross-section view of the device shown in FIG. 9.
Figure 11:
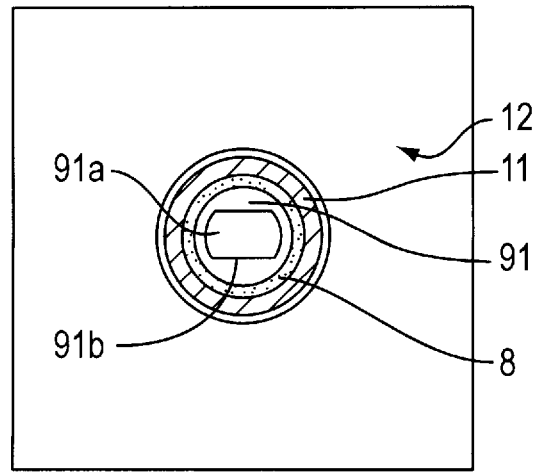
FIG. 11 is a partial cross-section of FIG. 10 along line 11—11 of this same device.

FIGS. 9 to 11 show a special embodiment of the gas feed and of the impermeability system of the mold. The mandrel 9 is constituted by two elements 91 and 92 which are partially inserted into each other, of which one is a secondary compressed fluid-feed element mounted on the other principal conical element 91, which supports the composite structure 11. The secondary element 92 provides impermeability of the bladder 8 by being wedged against the surface of revolution 12b having a shape complementary to the inlet of the mold 12. To this end, the edges of the bladder 8 extend beyond the principal conical element 91 of the mandrel 9 and the bladder covers the front tubular part 91a, fitting into the mold 12 and in the shape of a truncated cone of the secondary element 92, the edges 92d of the small base being pressed against the end of the large base of the principal conical element 91. The bladder is wedged between the surface of the conical part 92a of the secondary element 92 and the inner walls 12b of the mold 12.

An axial bore 92b connected to the external gas supply passes through the secondary element 92 as mounted. The compressed fluid feed inside the bladder 8 takes place through one or more feed orifices 92c, which are preferably produced on the edges 92b of the small base of the conical part 92a of the secondary element 92, as shown in FIGS. 9 and 10.

The principal element 91 is advantageously extended by an axial positioning dog 91a extending into the bore of the secondary element 92. This positioning dog 91a preferably comprises one or more flat surfaces 91b making possible the passage of the fluid through the bore of the secondary mounted element 92. Finally, the principal element 91 may be connected inside the secondary element 92 by using a pin 93 or by any other means.

Figure 12:
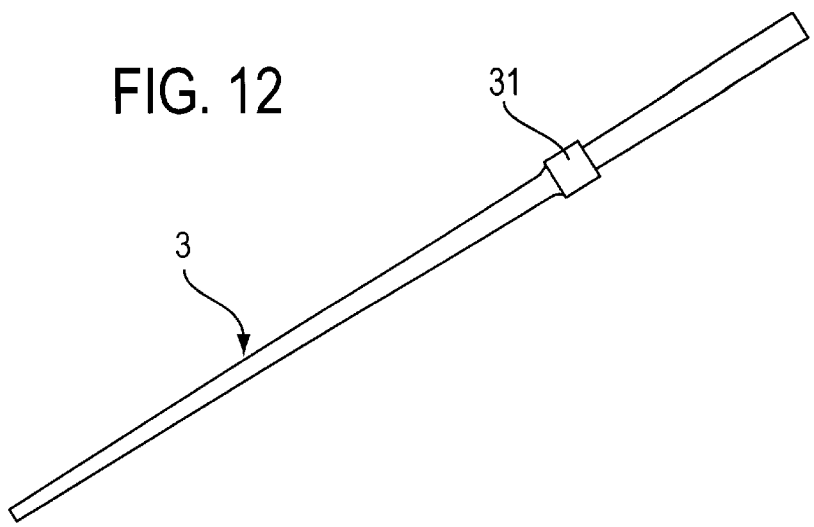
FIGS. 12 and 13 illustrate examples of shafts produced in accordance with the invention.
Figure 13:
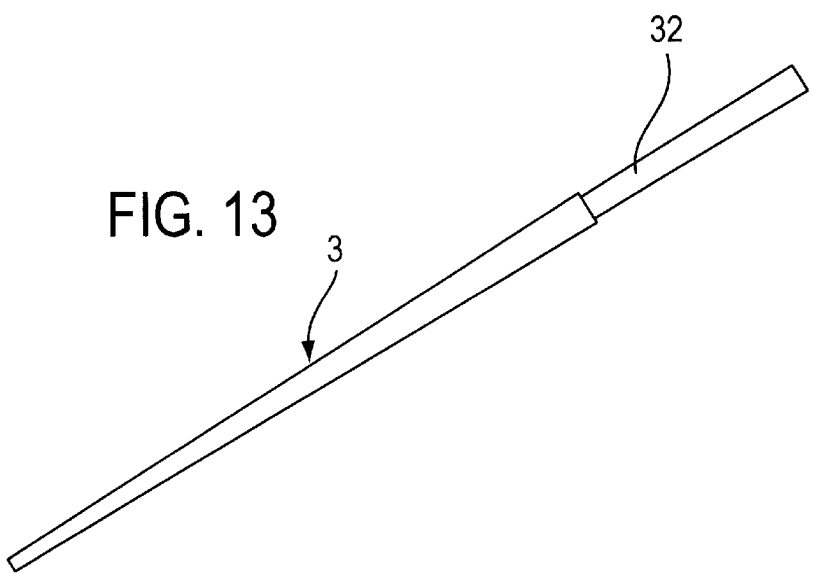

FIGS. 12 and 13 illustrate tubular, slightly conical shafts produced according to the invention. The invention makes it possible to create zones of enlargement 31 or narrowing 32 while preserving the continuity of the layers of fiber sheets in these transition areas, thereby conferring homogeneity of the mechanical properties along the shaft, and thus, effective reproducibility of these properties from one shaft to another. A proper finished state requiring no reworking is also obtained.

These areas are, in particular, formed at various locations depending on the club, so as to delineate a specific deformation profile, or in order to shift the moment of inertia of the club without adding weight, for example.

Finally, these areas can also be used for the incorporation of a handle or grip flush with the surface of the club, e.g., when the shaft is narrowed, as shown in FIG. 13. The space created by the narrowing of the shaft can be filled with a plastic or metal ring. Depending on the nature and properties of the material used, this ring can contribute to the dampening or balancing of the club.

Figure 14:
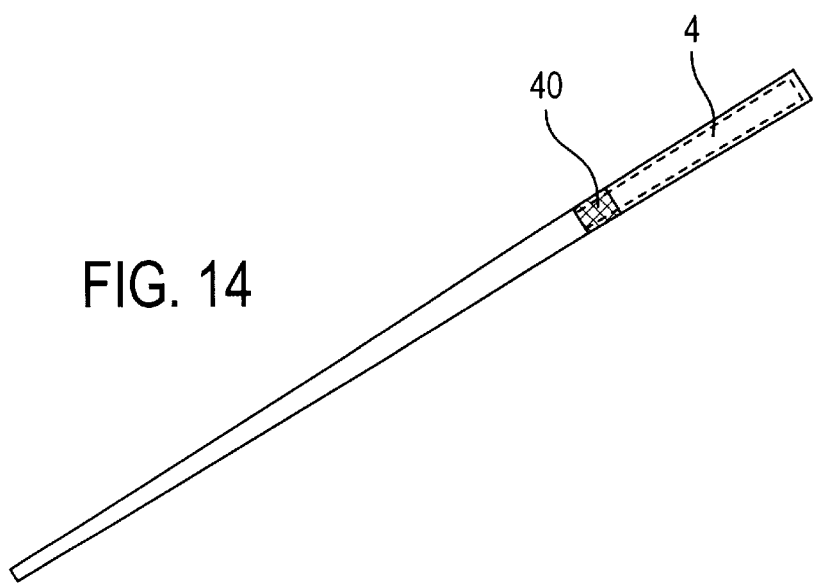
FIG. 14 shows an example of the shaft in FIG. 13, incorporating a handle and filling ring.

FIG. 14 illustrates an example of a shaft 3 fitted with a narrowed zone 32, which is covered by a ring 40 and an incorporated grip 4 adjacent to the ring. The ring 40 may be metal weight or a dampening element made, for example, of a viscoelastic material.

An enlarged area of the shaft may serve as an element used for aiming, marking, etc.

What is claimed is:

1. Process for the manufacture of a golf club shaft made of a composite material, said process comprising the successive steps of:
   (a) producing an elongated, flexible impermeable bladder by dipping a template in a coagulating bath and then in a latex bath, said bladder having a first, open end and a second, closed end and a cross-section which decreases from adjacent said first end toward said second end, said bladder having a thickness of less than 1.0 mm and a length in excess of 1.0 meter;
   (b) arranging said bladder around a rigid mandrel having a substantially conical shape identical with a shape of said template, and a length at least equal to a length of a shaft to be produced;
   (c) preparing a continuous lay-up of fiber sheets having an orientation which depends on characteristics desired;
   (d) dressing said mandrel with said lay-up of fiber sheets comprising fibers impregnated with an organic resin matrix to obtain a substantially frustoconical composite structure;
   (e) placing said composite structure in a mold which has an impression which incorporates at least one area of enlargement or narrowing; and
   (f) carrying out a molding operation by applying inside said bladder at least one internal pressure exerted by a fluid feed through said open end, so as to compress said composite structure against said impression of said mold and to produce a counterform of said at least one area on desired locations of said shaft.

2. Process according to claim 1, wherein said bladder has a thickness in a range of 0.5 to 0.8 mm.

3. Process according to claim 1, wherein said internal pressure is exerted by compressed air feed in a range of 10 to 15 bars.

4. Process according to claim 1, wherein after step (d) and before step (e), at least a substantial portion of said mandrel is removed from said composite structure.

5. Process according to claim 1, wherein said mandrel is used as a template during the dipping step.

6. Process for manufacture of a golf club shaft made of a composite material, said process comprising the successive steps of:
   (a) arranging an elongated, flexible impermeable bladder made by dipping a template in a coagulating bath and then in a latex bath around a rigid mandrel having a substantially conical shape substantially identical with a shape of said template, and a length at least equal to a length of shaft to be produced; said bladder having a first, open end and a second, closed end and a cross-section which decreases from adjacent said first end toward said second end, said bladder having a thickness of less than 1.0 mm and a length in excess of 1.0 meter;
   (b) preparing a continuous lay-up of fiber sheets having an orientation which depends on characteristics desired;
   (c) dressing said mandrel with said lay-up fiber sheets comprising fibers impregnated with an organic resin matrix to obtain a frustoconical composite structure;
   (d) placing said composite structure in a mold which has an impression which incorporates at least one area of enlargement or narrowing; and (e) carrying out a molding operation by applying inside said bladder at least one internal pressure exerted by a fluid feed through said open end, so as to compress said composite structure against said impression of said mold and produce a counterform of said area on said shaft in desired locations.

7. A process for the manufacture of a golf club shaft made of a composite material, said process comprising:

producing an elongated, flexible, impermeable bladder having a length generally corresponding to a length of the golf club shaft to be manufactured, said producing comprising immersing an elongated template into a coagulating bath and, thereafter, immersing said elongated template into a latex bath, said elongated template having a non-uniform transverse dimension, said bladder thus produced having a first, open end and a second, closed end, said bladder having a cross section decreasing in a direction from said first end toward said second end;

arranging said bladder around a rigid mandrel, said mandrel having a generally frusto-conical portion, said frusto-conical portion of said mandrel having a first end and a second, lesser diameter, end, said bladder being arranged on said frusto-conical portion of said mandrel;

dressing said frusto-conical portion of said mandrel with a lay-up of resin-impregnated fibers, said fibers being oriented as a function of desired shaft characteristics, said dressing of said mandrel providing a generally frusto-conical composite structure;

placing said composite structure within a mold, said mold hang an interior impression having at least one area of enlargement or narrowing; and carrying out a molding operation comprising applying, inside said bladder, fluid pressure and thereby forcing said composite structure against said interior impression of said mold, thereby conferring to said composite structure a shape, said shape including a counterform of said at least one area of enlargement or narrowing, said shape being a final shape of said golf club shaft.

8. A process for the manufacture of a golf club shaft made of a composite material, said process comprising:

producing an elongated, flexible, impermeable bladder having a length generally corresponding to a length of the golf club shaft to be manufactured, said bladder having a first, end and a second end, said bladder having a cross section decreasing in a direction from said first end toward said second end;

arranging said bladder around a rigid mandrel, said mandrel having a generally frusto-conical portion, said frusto-conical portion of said mandrel having a first end and a second, lesser diameter, end, said bladder being arranged on said frusto-conical portion of said mandrel;

dressing said frusto-conical portion of said mandrel with a lay-up of resin-impregnated fibers, said fibers being oriented as a function of desired shaft characteristics, said dressing of said mandrel providing a generally frusto-conical composite structure;

placing said composite structure within a mold, said mold having an interior impression having at least one area of enlargement or narrowing; and carrying out a molding operation comprising applying, inside said bladder, fluid pressure and thereby forcing said composite structure against said interior impression of said mold, thereby conferring to said composite structure a shape, said shape including a counterform of said at least one area of enlargement or narrowing, said shape being a final shape of said golf club shaft.

9. A process for the manufacture of a golf club shaft according to claim 8, wherein:

said producing an elongated, flexible, impermeable bladder comprises dipping an elongated template into a latex bath, said elongated template having a cross section decreasing in a direction from a first end toward a second end, to thereby form said bladder of latex.

10. A process for the manufacture of a golf club shaft according to claim 9, wherein;

said producing an elongated, flexible, impermeable bladder further comprises, after said dipping, heating said latex at a predetermined temperature for a predetermined duration and, thereafter, cooling said latex.

* * * * *